United States Patent

[11] 3,620,620

| [72] | Inventor | Shigehiro Komori<br>Kanagawa-ken, Japan |
| [21] | Appl. No. | 794,153 |
| [22] | Filed | Jan. 27, 1969 |
| [45] | Patented | Nov. 16, 1971 |
| [73] | Assignee | Canon Camera Kabushiki Kaisha<br>Tokyo, Japan |
| [32] | Priority | Jan. 1, 1968 |
| [33] | | Japan |
| [31] | | 43/6133 |

[54] ORIGINAL HOLDER RECIPROCATING-TYPE DRIVING DEVICE FOR PHOTOCOPYING MACHINE
5 Claims, 7 Drawing Figs.

[52] U.S. Cl. ........................................... 355/8,
355/50, 355/75
[51] Int. Cl. ................................................ G03b 27/62
[50] Field of Search .......................................... 355/8, 75,
50

[56] References Cited
UNITED STATES PATENTS

| 3,267,797 | 8/1966 | Fowlie et al. ................. | 355/8 |
| 3,421,816 | 1/1969 | Robertson et al. ............ | 355/8 |
| 3,480,360 | 11/1969 | Mallory et al. ................ | 355/8 |

*Primary Examiner*—Samuel S. Matthews
*Assistant Examiner*—Richard A. Wintercorn
*Attorney*—Ward, McElhannon, Brooks & Fitzpatrick

ABSTRACT: An original holder for photocopying machine on which the original is disposed for photocopying is driven to reciprocate in a predetermined stroke. In the forward stroke in one direction, the original disposed on the holder is copied to a photosensitive paper. At the end of the forward stroke, the movement of the original holder is switched to the return stroke in the opposite direction by means of interlocking clutch mechanisms to bring it back to the initial position. At the initial position, the original holder is stopped for replacement of the original and is ready to undertake the next succeeding photocopying step in the forward stroke.

ORIGINAL HOLDER RECIPROCATING-TYPE DRIVING DEVICE FOR PHOTOCOPYING MACHINE

The present invention relates to an original holder reciprocating type photocopying machine in which a photosensitive paper is exposed for photography while the original holder carrying thereupon an original makes one reciprocal motion and more particularly to a driving device for reciprocating the original holder of the photocopying machine of the type described.

Well known in the electronic photocopying machine art is a photocopying machine of the type in which an original is copied to a photosensitive paper while an original holder upon which is held the original to be copied is reciprocated. In such kind of photocopying machine copying is made when the original is reciprocated so that a slit is disposed immediately before a position where the exposure of a photosensitive paper is started and the so called slit exposure photography is made in which the image of the moving original is focused upon the photosensitive paper advanced in synchronism with the movement of the original through a stationary optical image focusing or projection system. Therefore, it is sufficient to incorporate the stationary optical system for slit exposure into the main body of the photocopying machine of the type described so that the space required for installation of the optical system within the main body of the machine is considerably less as compared with the photocopying machines of the conventional type in which the original is held stationary while the image focusing or projection system is moved so as to effect the slit exposure upon a moving photosensitive paper. Thus, the photocopying machine of the type described can be made compact in size without the necessity of a mechanism for moving the image focusing or projection system so that the photocopying machine of the type described has an excellent economical advantage from the standpoint of its fabrication cost. Therefore, the photocopying machine of the type in which the original holder reciprocates is best suited as a photocopying machine which must be compact in size and low at manufacturing cost. However, in such type of the photocopying machine, the original holder makes a forward stroke or return stroke in synchronism with the movement of a photocopying paper and thereafter the movement of the original holder must be reversed so as to return the holder to its initial position so that the original holder driving section is very much complicated in construction. For example, known in the art is a method for reciprocating an original in which a clutch is coupled to a driving source which rotates in one predetermined direction at a predetermined speed all the time so that the reciprocation of the original can be effected by connecting or disconnecting the clutch. For example, in the forward stroke of the original holder, the clutch is coupled so that the driving force from the driving source may be imparted to the original holder so as to cause the original holder to make a forward stroke and concurrently, a portion of the driving force is stored by a spring or weight so that this stored energy may be used to cause the original holder to return by disconnecting the transmission of the driving force from the driving source to the original holder by releasing the clutch. In the above described construction, however, the energy stored by the spring or weight is not sufficient enough to allow a high-speed reciprocating motion of the original holder. Furthermore, the reciprocation is not stable. As a means for actuating the clutch for transmission and interruption of the driving power from the driving source, means adapted to be actuated by electric signals such as magnet clutches, solenoid plungers, etc., must be used to that the fabrication cost of the conventional device of the type described becomes higher. Moreover, known in the art is an original holder reciprocating device of the type in which devices for forwarding and returning an original holder are respectively disposed at the ends of the forward and return strokes. Such reciprocating device, however, has defects that the assembly becomes complicated because two individual driving devices must be installed and that the original holder reciprocating device becomes complicated in construction because a mechanism for interlocking two individual driving devices with each other must be provided.

An object of the present invention is, therefore, to provide an original holder reciprocating device in which the above described defects encountered in the conventional devices are completely eliminated and which is extremely compact in size and reliable in operation.

Another object of the present invention is to provide an original holder reciprocating device as a unit by disposing a forward rotating and a reverse rotating members at the opposing sides of a rotary body respectively which rotates in synchronism with the reciprocating motion of an original holder so as to facilitate the assembly of the above described unit into a photocopying machine.

A still another object of the present invention is to provide an original holder reciprocating device in which the stored energy for reversing the reciprocation is released before the forward stroke of an original holder is switched to the return stroke so as to ensure the switching from the forward stroke to the return stroke.

A further object of the present invention is to provide an original holder reciprocating device in which the speeds of an original holder are made different in the forward and return strokes so as to effect the quick-return of the original holder, thereby reducing a copying time and permitting the fast photocopying operation. A still further object of the present invention is to provide an original holder reciprocating device in which the changeover from the forward stroke to the return stroke of the original holder can be effected very rapidly so as to reduce the time required for photocopying. According to the present invention, the above objects can be accomplished by disposing in the coaxial or substantially coaxial relation two driven bodies each of which is rotated in the direction opposite to that of the other by means of a drive shaft which is rotated at a predetermined speed in one predetermined direction from a single driving source all the time; disposing rotatably a rotary body for reciprocating an original holder in substantially coaxial and side-by-side relation with the above described driven bodies; disposing rotatably two driven members upon the rotary body, these driven members being adapted to engage with driving members disposed upon said driven bodies respectively, in such a manner that when one of said driven members engages with its mating driving member, the other driven member remains in the disengagement relation with its mating driving member; rotating the rotary body in the direction of the rotation of a driven shaft carrying one driving member in engagement with its mating driven member so as to forward the original holder which is drivingly coupled to the rotary body; and releasing said engagement of said one driving member with said its mating driven member while engaging said the other driving member with said its mating driven member when the original holder reaches the end of its forward stroke so that the engagement of the rotary body with said driven body is released and engaged with the other driven body which rotates in the direction opposite to said one driven body, whereby the rotary body is reversed in rotation, thereby causing the original holder to make the return stroke.

The above and other objects, advantages and features of the present invention will become apparent form the following description taken in conjunction with the accompanying drawings in which.

Figure 1:
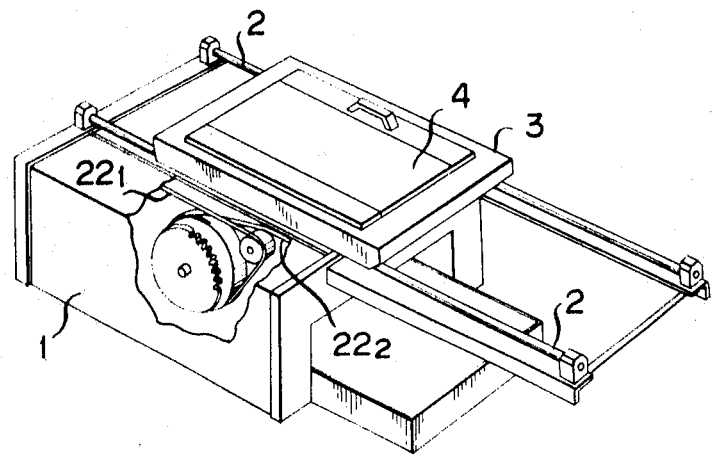
FIG. 1 is a perspective view of one preferred embodiment of a photocopying machine into which is incorporated an original holder reciprocating device according to the present invention.
Figure 2:
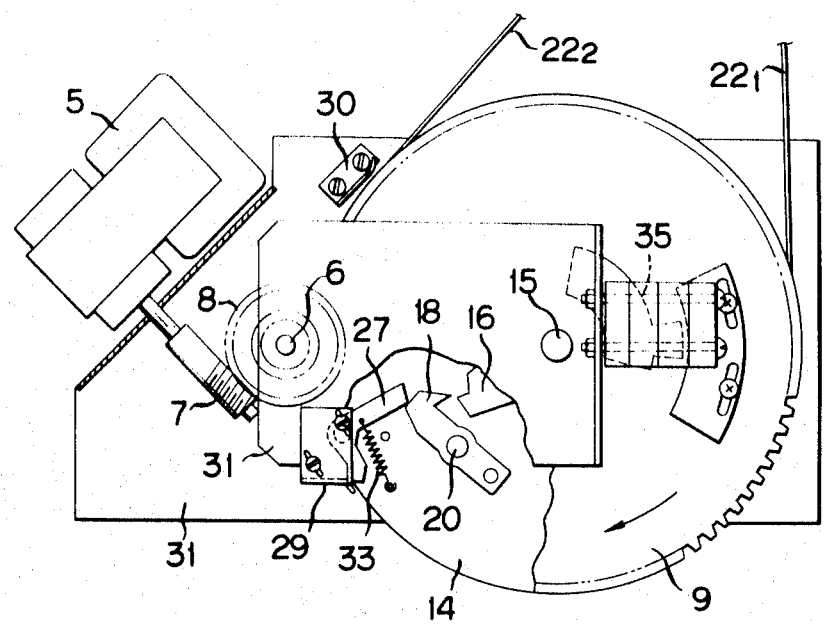
FIG. 2 is a front view of one embodiment of an original holder reciprocating device according to the present invention.
Figure 3:
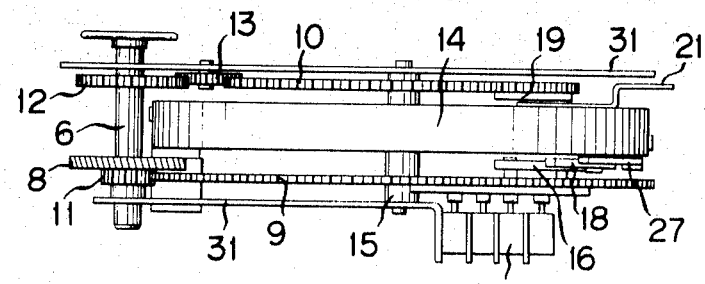
FIG. 3 is a plane view of the embodiment shown in FIG. 2.
Figure 4:
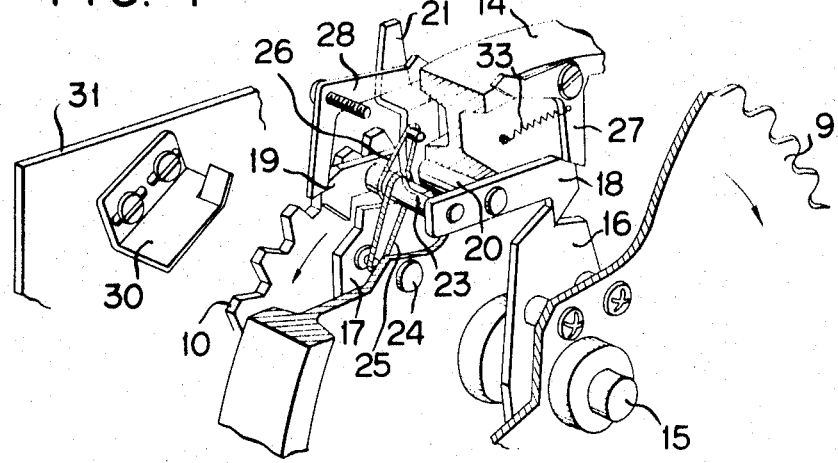
FIG. 4 is a perspective view of the reciprocating motion reversing mechanism thereof.
Figure 5:
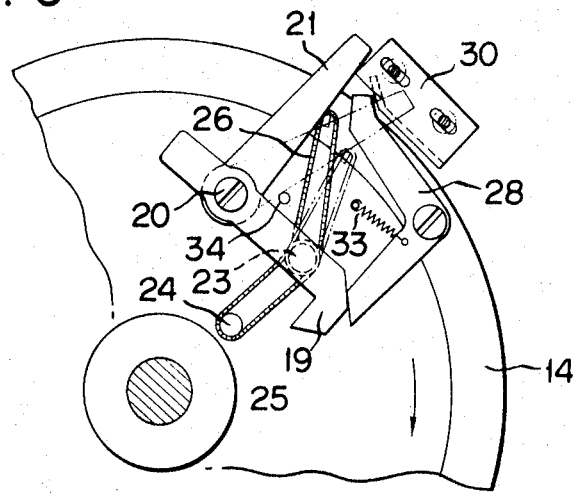
FIG. 5 is a partial rear view thereof.
Figure 6:
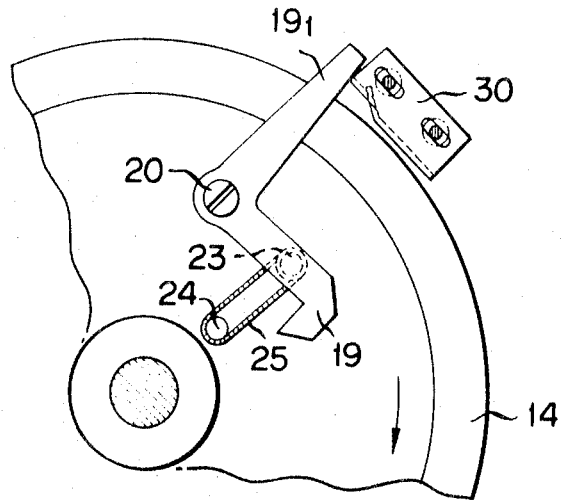
FIG. 6 is a side view of another embodiment of the present invention.
Figure 7:
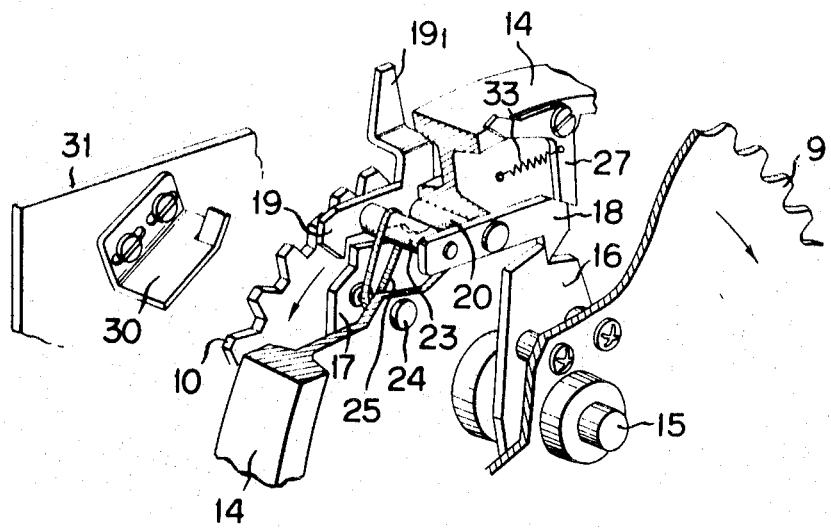
FIG. 7 is a perspective view of the embodiment shown in FIG. 6.

Now referring FIGS. 1 to 5 illustrating one embodiment of the present invention, reference numeral 1 designates a housing; 2's are a pair of rails disposed upon the upper surface of the housing 1; 3 shows an original holder in which an original to be copied is disposed upon a transparent plate such as glass, etc., and held in position by means of a clamping plate 4 made of rubber or the like; 5 (see FIG. 2) is a motor; 6 is a drive shaft rotated by the motor 5 through worm gear and wheel 7 and 8 or a belt; and 9 and 10 show toothed wheels loosely fitted over a common shaft 15. One toothed wheel 9 is in mesh with the toothed wheel 11 carried by the drive shaft 6 and is caused to rotate in the clockwise direction. On the other hand, the other toothed wheel 10 is coupled to a toothed wheel carried by the drive shaft 6 through an idle gear 13 and is rotated in the direction opposed to the direction of rotation of the toothed wheel 9 at a rotational speed which is $n$-integer multiples that of the toothed wheel 9. Reference numeral 14 designates a reciprocating rotary drum carried by the common shaft 15 and disposed between the toothed wheels 9 and 10; 16 and 17 are driving pawls fixed to the toothed wheels 9 and 10 respectively in opposed relation with the rotary drum 14 to 18 and 19, driven or follower pawls in the form of a lever attached to the ends of a pin 20 extending through the rotary drum 14 respectively in such a manner that when the driving pawl 16 engages with the driven or follower pawl 18, the driving pawl 17 is disengaged from the driven or follower pawl 19 and vice versa, thus constructing a seesaw mechanism. A coiled spring 25 is loaded between a pin 25 extending from the rotary drum 14 and another pin 23 interconnecting the driven or follower pawls 18 and 19 so that normally the pawl 16 is released from the driven or follower pawl 18 while the pawl 17 is in engagement with the driven or follower pawl 19. Reference numeral 21 designates a changeover or reversing lever loosely attached to the pin 20 of the driven or follower pawls 18 and 19 and between the lever 21 and the pin 23 is loaded a coiled spring 26 stronger than the spring 25. Reference numerals 27 and 28 designate stoppers respectively, which serve for securing the engagement of the driven or follower pawls 18 and 19 with the driver pawls 16 and 17 respectively. The stoppers 27 and 28 are pivoted to the rotary drum 14. Reference numerals 29 and 30 designate actuating or release elements disposed on the sides of a machine frame 31 for releasing the actuation of the stoppers 27 and 28. The actuating element 30 is also adapted to actuate the changeover lever 21. Wires $22_1$ and $22_2$ which are neither expandable or compressible such as steel bands are wound around the periphery of the rotary drum 14 in the opposite directions with each other with one ends of these wires being securely fixed to the rotary drum 14 while the other ends being crossed in a form of X and thereafter fixedly secured to the ends of the original holder 3 respectively. With the device having the construction and arrangement as described hereinbefore, the mode of operation will be described hereinafter. FIG. 4 illustrates the state in which the motor 5 is driven so as to rotate the toothed wheels 9 and 10 in the opposite directions with each other; and the driving pawl 16 engages with the driven or follower pawl 18 so that the reciprocating rotary drum 14 is rotated together with the toothed wheel 9, whereby the wire $22_1$ is wound around the rotary drum 14 while the wire $22_2$ is unwound or released, thereby causing the return movement of the original holder 3. In this case, the driven or follower pawl 18 is held in its operative position so as to engage with the driving pawl 16 by means of the stopper 27 against the spring 25. At the end of the return stroke in the preceding step, the stopper 27 is actuated by the actuating or releasing element 29 disposed upon the machine frame 31 so that the stopper 27 is caused to rotate against the spring 33, thereby releasing the driven or follower pawl 18. The pawl 18, therefore, is caused to rotate by the coiled spring 25, thereby disengaging from the driving pawl 16, whereby the transmission of the rotation to the rotary drum 14 is ceased. Immediately after the above operation, toothed wheels 9 and 10 are stopped, i.e., the original holder 3 is stopped temporarily at the right side in FIG. 1, whereby the replacement of originals, etc., may be effected. In this case, the driven or follower pawl 19 is caused to rotate in the counterclockwise direction in FIG. 4 together with the pawl 18 and is advanced to a position where the driven or follower pawl 19 can engage with the driving pawl 17. Upon depressing a starting button again, the device is driven so that the rotation of the rotary drum 14 by the toothed wheel 10 rotating in the counterclockwise direction is started, whereby the original holder 3 is driven into the forward stroke. Immediately before the original holder 3 reaches the end of its forward stroke, the changeover lever 21 is actuated by the actuating or releases element 30 so that the lever 21 has a tendency to switch the engagement of the driven pawl 19 to that of the pawl 19 through the coiled spring 26 and the pin 23. But since the driven or follower pawl 19 is held in position by means of the stopper 28, the changeover lever 21 is only allowed to extend the spring 26 as shown in FIG. 5 and rotated to the position indicated by the solid and dotted line while the energy is being stored or accumulated in the coiled spring 26. The rotation of the rotary drum 14 is therefore further permitted, that is, the original holder 3 is continuously driven into the forward stroke. When the original holder 3 reaches the end of its forward stroke, the stopper 28 is pushed down by the actuating or release element 30, thus releasing the driven or follower pawl 19. At this instant, the coiled spring 26 overcomes the spring 25 so that the engagement of the driven or follower pawl 19 is switched to that of the pawl 18. In this case, the driving pawl 16 extending from the toothed wheel 9 is just in a position for engagement with the driven or follower pawl 18 so that the device is immediately switched to the return stroke, that is the original holder 3 immediately starts its return stroke. In the accompanying drawings, reference numeral 34 designates a stopper for the changeover lever; and 35 shows a plurality of microswitches for an electric path control circuit which are operated by the cam carried by the toothed wheel 9. In the first embodiment of the present invention as described hereinabove, immediately before the original holder 3 reaches the end of the forward stroke, the energy storage members, that is, the lever 21 and the coiled spring 26 are charged by means of the release member 30, and when the lock member is released by the release member 30, that is when the original holder reaches the end of the forward stroke, the energy accumulated in the energy storage member is imparted to the lever 19 so that the engagement of the lever 19 with the driving pawl 17 is instantaneously released while the lever 18 engages with the driving pawl 16. Therefore, the changeover of power transmission from one pawl to the other can be smoothly, positively and instantaneously effected so that the rotary drum 14 is coupled to the driven toothed wheel 9 which rotates in the reverse direction, whereby the rotary drum 14 can be reversed in rotation instantaneously. Concurrently, the original holder 3 is switched from the forward stroke to the return stroke. As described hereinbefore, since the original holder can be switched from the forward stroke to the return stroke positively at high speed, the first embodiment of the present invention is best suited especially when the high speed photocopying is made. In addition, unstable switching action can be effectively eliminated. Next another embodiment of the present invention will be described with reference to FIGS. 6 and 7. The reciprocating device shown in FIGS. 6 and 7 is similar in construction to that of the first embodiment described hereinbefore with the exception that a follower or driven pawl 19 is formed integral with a changeover lever 21 and there is provided with no stopper 28. In FIGS. 6 and 7, the L-shaped follower or driven pawl 19 is rotatably pivoted to the rotary drum 14 by means of a pivot 20, and one end of the pawl 19 is formed so as to engage with the driving pawl 17 while the other end $19_1$ is adapted to engage with the actuating element 30 when the original holder reaches a position immediately before the end of the forward stroke. A spring 25 is disposed so as to bias the driven pawl 19 toward the driving pawl, the spring 25 being disposed between the pin 23 extending from the driven pawl 19 and pin 24 extending from the rotary drum 14. In operation, as described with respect to the first embodiment, the rotation of the motor 5 is transmitted to the drive shaft 6 so as to normally rotate both of the forward rotating and reversing toothed wheels 10 and 9. When the original holder 3 is positioned at the starting point of the forward stroke, the driving pawl 17 of the forward rotating toothed wheel 10 is in engagement with the driven pawl 19 by means of the spring 25 so that the driving force of the forward rotating toothed wheel 10 is transmitted to the rotary drum 14 through the driven pawl 19, thereby rotating the rotary drum 14 in the stroke (the forward direction) indicated by he arrow in FIG. 6, whereby the original holder 3 is caused to make a forward stroke through the wires $22_1$ and $22_2$. When the rotary drum 14 makes substantially one rotation as described above, the end $19_1$ of the driven pawl 19 contacts with the element 30 and then rotates in the counterclockwise direction against the spring 25 so that the engagement of the pawl 17 with the driven pawl 19 is released. Consequently the transmission of the driving power to the rotary drum 14 is interrupted so that the rotary drum is stopped, thereby temporarily stopping the forward stroke of the original holder. When the driven pawl 19 is rotated in the counterclockwise direction (in FIG. 6), the other driven pawl 18 interconnected through the shaft 20 with the pawl 19 is rotated in the clockwise direction so that the driven pawl 18 is advanced to a position for engagement with the driving pawl 16. In this case, the holding lever 27 is also rotated in the clockwise direction by the spring 33 and engages with the pawl 18 so as to hold the pawl 18 in this position. Thereafter, the driving pawl 16 which is normally rotated in the clockwise direction engages with the driven pawl 18 so that the rotary drum 14 is rotated in the reverse direction, whereby the original holder is caused to make the return stroke through the wires. When the rotary drum 14 makes substantially one rotation, the holding lever 27 contacts with the actuating element 29 and rotates so that the engagement with the driven pawl 18 is released. Consequently, the engagement of the driven pawl 18 with the driving pawl 16 is released by the spring 25 so that the rotary drum 14 and the original holder 3 are stopped. Concurrently, the driven pawl 19 returns to its initial position where the pawl 19 can engage with the driving pawl 17. As described hereinbefore, the automatic changeover from the forward rotation to the reverse rotation or vice versa of the rotary drum can be effected substantially every one rotation of the rotary drum so that the reciprocating movement of the original holder 3 can be effected. According to the second embodiment of the present invention as described hereinbefore, the construction of the driven pawl member is simpler as compared with the pawl of the first embodiment so that the fabrication and adjustment can be effected more easily.

What is claimed is:

1. An original holder reciprocating device for a photocopying machine in which an original is imaged onto a photosensitive member during a single reciprocation of the holder comprising: a driving source rotatable in a given direction; first and second substantially coaxially mounted driven members coupled to said driving source to be driven thereby in opposite directions; first and second engaging means coupled, respectively, to said first and second driven members; a rotatable body mounted for rotation substantially coaxially with said first and second driven members and drivingly coupled to said original holder, said body carrying first and second drive coupling means disposed for cooperation, respectively, with said first and second engaging means, said body being rotated in one direction when said first drive coupling means engages said first engaging means and being rotated in the opposite direction when said second drive coupling means engages said second engaging means; means interconnecting said first and second drive coupling means such that only one of said engaging means can be engaged at a time; means normally maintaining said first drive coupling means in engagement with said first engaging means; latch means disposed on said body and operative when said second drive coupling means engages said second engaging means to maintain the engagement therebetween; a first release member operative when said body is rotated to a first position corresponding to one end of the travel of said original holder for disengaging said first drive coupling means from said first engaging means and engaging said second drive coupling means with said second engaging means to reverse the driven direction of rotation of said body; and a second release member operative when said body is rotated back to a second position for releasing said latch means thereby releasing said second drive coupling means from engagement with said second engaging means and permitting said first drive coupling means to reengage said first engaging means.

2. A device according to claim 1, wherein said first drive coupling means comprises an energy storage member for accumulating the energy for releasing the engagement between said first drive coupling means and said first engaging means.

3. A device according to claim 1, wherein the peripheral speed of said rotatable body is equal to the speed of movement of said original holder; and wherein said body is drivingly coupled with said original holder by power transmission means.

4. A device according to claim 1, wherein said first and second driven members are driven at different speeds.

5. A device according to claim 2, further comprising a second latch means for maintaining said first drive coupling means in engagement with said first engaging means when said energy storage member is charged, said second latch means being released by said first release member when said body reaches said first position for permitting said energy storage member to release its stored energy and disengage said first drive coupling means from said first engaging means while engaging said second drive coupling means with said second engaging means.

* * * * *

PO-1050
(5/69)

Our Ref: 129-
Canon 158

UNITED STATES PATENT OFFICE
CERTIFICATE OF CORRECTION

Patent No. 3,620,620                    Dated   November 16, 1971

Inventor(s)  Shigehiro Komori

It is certified that error appears in the above-identified patent and that said Letters Patent are hereby corrected as shown below:

Col. 1, line 25, insert --photocopying-- before the word "machine";

Col. 2, line 57, "The above ......" should not be a new paragraph;

Col. 3, line 22, "14 to 18" should be --14:18--;

Col. 3, line 29, "a pin 25" should be --a pin 24--;

Col. 3, lines 34 & 47, "changeover" should be --change-over--;

Col. 4, lines 11, 17, 35, 66, "changeover" should be --change-over--;

Col. 4, line 13, "releases" should be --release--;

Col. 4, line 14, "to that of the pawl 19" should be --to that of the pawl 18--;

Col. 4, line 59, "high speed" should be --high-speed--;

Signed and sealed this 6th day of June 1972.

(SEAL)
Attest:

EDWARD M. FLETCHER, JR.
Attesting Officer

ROBERT GOTTSCHALK
Commissioner of Patents